J. S. BROOKS.
Sad Iron Heater.

No. 34,237.

Patented Jan. 28, 1862.

Witnesses
J. Fraser
Chas. Coots

Inventor
John S. Brooks

UNITED STATES PATENT OFFICE.

JOHN S. BROOKS, OF ROCHESTER, NEW YORK.

IMPROVEMENT IN SAD-IRON HEATERS.

Specification forming part of Letters Patent No. 34,237, dated January 28, 1862.

*To all whom it may concern:*

Be it known that I, JOHN S. BROOKS, of Rochester, in the county of Monroe and State of New York, have invented a new and useful Improvement in Heating Sad-Irons; and I do hereby declare the following to be a full and exact description of the same, reference being had to the accompanying drawings, and to the letters of reference marked thereon, in which—

Figure 1:
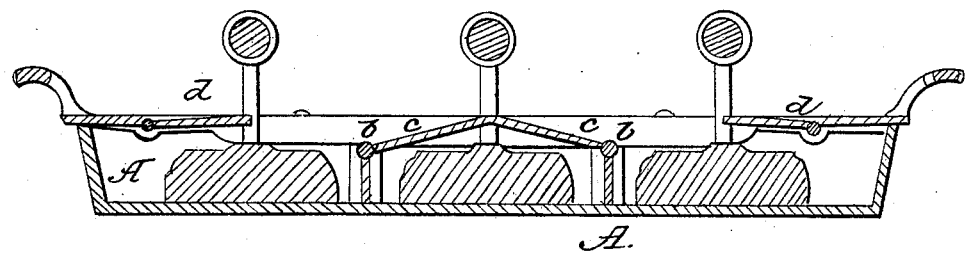
Figure 2:
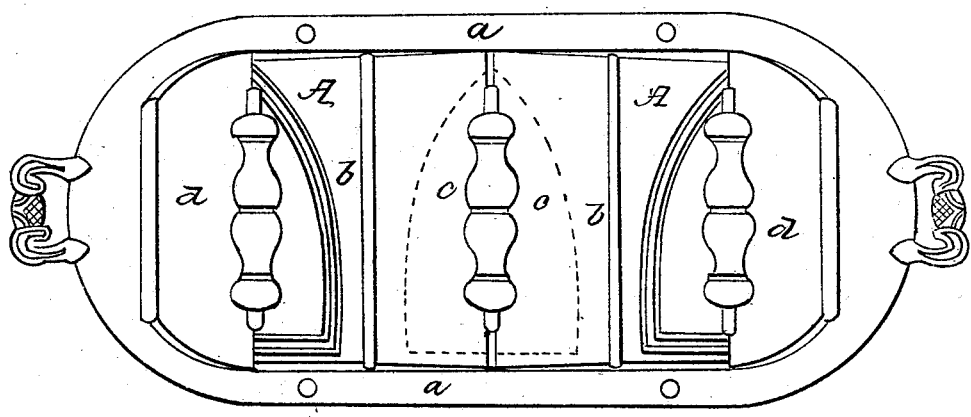

Figure 1 is a vertical longitudinal section, and Fig. 2 a plan view, of my improvement.

Like letters designate corresponding parts in both the figures.

My improved sad-iron heater consists of an oblong pan-formed utensil A, which is adapted to occupy the space of the opening in a cook stove or range when the two covers and center-piece are removed. It has a horizontal flange or rim a, extending around it, and to which is attached the pan for holding the irons. The pan A, which is about two inches deep, is divided into compartments by the partitions b b, each one being designed for the reception of a single sad-iron. The number of these compartments may vary with the size of the stove for which it is constructed; but in general a stove of ordinary size will receive three sad-irons, the number represented in the drawings. The covers c c are attached over the partitions and are hinged to turn to either side, and each one covers one-half of the compartment. The two outer covers d d are hinged to the flange a in such a manner as not to admit of their being raised sufficiently to turn outward, but always fall inward by their weight, covering half of the outside compartments. These covers are all provided with semicircular notches, which close around the handle of the sad-iron, confining the hot air within the compartment and leaving the handle out.

The operation of removing one of the irons from the heater raises the covers from that compartment and throws them over the adjoining one. If the center iron is covered and first taken out, by giving it a slight turn as the covers open they are thrown over the adjoining irons, concentrating the heat on them, and the act of removing them again covers the center iron, so that the proper one in rotation is always covered before it is used. It may be constructed of sheet or cast metal, but I prefer cast-iron as cheaper and equally as good in every respect.

The advantages of this improvement are that the irons are heated much more rapidly than when exposed to the cold air, by which a large proportion of the fuel is saved. The handles, which are always uncovered, become less heated than usual, giving the laundress less inconvenience. By confining the heat to the heating chamber or compartment less heat is radiated into the room, which is an important result in warm weather. The covers are changed to the compartment in which the cold iron is placed by the act of removing the heated one, thereby requiring no effort or attention on the part of the laundress. The apparatus is a cheap one, and its cost is soon compensated for by the saving of fuel which it effects.

What I claim as my invention, and desire to secure by Letters Patent, is—

An improved sad-iron heater consisting of the pan A, divided into separate compartments for each iron, with hinged falling lids or covers c d, so arranged that the removal of an iron from one chamber will cause the lid or lids to fall over the adjoining one, substantially in the manner and for the purposes herein described.

JOHN S. BROOKS.

Witnesses:
 J. FRASER,
 CHAS. COOTS.